US008172511B2

(12) United States Patent
Duong et al.

(10) Patent No.: US 8,172,511 B2
(45) **Date of Patent: *May 8, 2012**

(54) RADIAL COMPRESSOR WITH BLADES DECOUPLED AND TUNED AT ANTI-NODES

(75) Inventors: Loc Q. Duong, San Diego, CA (US); Shiv C. Gupta, San Diego, CA (US); Xiaolan Hu, San Diego, CA (US)

(73) Assignee: Hamilton Sunstrand Corporation, Rockford, IL (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/387,536

(22) Filed: May 4, 2009

(65) Prior Publication Data

US 2010/0278633 A1 Nov. 4, 2010

(51) Int. Cl.

| | |
|---|---|
| ***F03D 11/00*** | (2006.01) |
| ***F01D 29/00*** | (2006.01) |
| ***B63H 1/16*** | (2006.01) |
| ***F03B 3/12*** | (2006.01) |
| ***B64C 27/20*** | (2006.01) |

(52) U.S. Cl. .................... 415/119; 416/241 R; 416/500; 416/185

(58) Field of Classification Search .............. 416/241 R, 416/228, 500, 119, 185, 203; 415/119
See application file for complete search history.

(56) References Cited

U.S. PATENT DOCUMENTS

| | | | | |
|---|---|---|---|---|
| 3,508,843 | A | 4/1970 | Schmidt et al. | |
| 4,012,172 | A | 3/1977 | Schwaar et al. | |
| 4,108,573 | A | 8/1978 | Wagner | |
| 4,370,560 | A | 1/1983 | Faulkner et al. | |
| 4,627,234 | A | 12/1986 | Schuh | |
| 4,732,532 | A | 3/1988 | Schwaller et al. | |
| 4,815,277 | A | 3/1989 | Vershure, Jr. et al. | |
| 4,834,622 | A | 5/1989 | Schuh | |
| 4,916,893 | A | 4/1990 | Rodgers | |
| 5,140,819 | A | 8/1992 | Napier et al. | |
| 5,491,308 | A | 2/1996 | Napier et al. | |
| 5,681,145 | A | 10/1997 | Neely et al. | |
| 5,993,161 | A | 11/1999 | Shapiro | |
| 6,042,338 | A | 3/2000 | Brafford et al. | |
| 6,379,112 | B1 | 4/2002 | Montgomery | |
| 6,471,482 | B2 | 10/2002 | Montgomery et al. | |
| 6,481,972 | B2 | 11/2002 | Wang et al. | |
| 6,904,949 | B2 | 6/2005 | Decker et al. | |
| 7,014,144 | B2 | 3/2006 | Hein et al. | |
| 7,206,709 | B2 | 4/2007 | Griffin et al. | |
| 7,252,481 | B2 | 8/2007 | Stone | |
| 7,500,299 | B2 | 3/2009 | Dupeux et al. | |
| 7,789,627 | B2 | 9/2010 | Chiang et al. | |
| 2002/0174656 | A1 * | 11/2002 | Hein | 60/737 |
| 2006/0029493 | A1 | 2/2006 | Schwaller et al. | |
| 2008/0145228 | A1 * | 6/2008 | Truckenmueller et al. | 416/203 |
| 2009/0191047 | A1 | 7/2009 | Schlinker et al. | |
| 2010/0278632 | A1 * | 11/2010 | Duong et al. | 415/119 |

OTHER PUBLICATIONS

PDF document found at: http://www.turbomachinerymag.com/articles/2006/0306p21ppt.pdf, last visited Apr. 3, 2009.

* cited by examiner

*Primary Examiner* — Chuong A. Luu
(74) *Attorney, Agent, or Firm* — Kinney & Lange, P.A.

(57) ABSTRACT

A gas turbine engine includes a radial compressor with first and second blades. The first and second blades have tuned leading edges that prevent natural frequencies from exciting at speeds within an expected operating speed range.

24 Claims, 6 Drawing Sheets

RADIAL COMPRESSOR WITH BLADES DECOUPLED AND TUNED AT ANTI-NODES

CROSS-REFERENCE TO RELATED APPLICATION

Reference is made to application Ser. No. 12/387,535 entitled "RADIAL COMPRESSOR OF ASYMMETRIC CYCLIC SECTOR WITH COUPLED BLADES TUNED AT ANTI-NODES", which is filed on even date and is assigned to the same assignee as this application.

Reference is also made to application Ser. No. 11/958,585 entitled "METHOD TO MAXIMIZE RESONANCE-FREE RUNNING RANGE FOR A TURBINE BLADE", filed on Dec. 18, 2007 by Loc Q. Duong, Ralph E. Gordon, and Oliver J. Lamicq and is assigned to the same assignee as this application.

BACKGROUND

The present invention relates to radial compressors, and in particular, to radial compressors with blades tuned according to natural frequency.

Gas turbine engines typically include several sections such as a compressor section, a combustor chamber, and a turbine section. In some gas turbine engines, the compressor section includes a radial compressor with a series of main blades and splitter blades connected by a disc. During operation of the gas turbine engine, the main blades and splitter blades can be subject to vibratory excitation at frequencies which coincide with integer multiples, referred to as harmonics, of the radial compressor's rotational frequency. As a result of the vibratory excitation, the main blades and/or the splitter blades can undergo vibratory deflections that create vibratory stress on the blades. If the vibratory excitation occurs in an expected operating speed range of the radial compressor, the vibratory stresses can create high cycle fatigue and cracks over time.

SUMMARY

According to the present invention, a gas turbine engine includes a radial compressor with first and second blades. The first and second blades have tuned leading edges that prevent natural frequencies from exciting at speeds within an expected operating speed range.

Another embodiment includes a method for tuning a radial compressor. The method includes designing the radial compressor to have a first blade connected to a second blade by a disc, wherein the first and second blades have first and second blade resonant modes that excite in an expected operating speed range of the radial compressor, modifying the disc to have a stiffness that reduces transmission of vibration between the first and second blades, tuning the first and second blades by modifying mass quantity at primary anti-nodes of the first and second blade resonant modes, and fabricating the radial compressor as modified and tuned.

DETAILED DESCRIPTION

Figure 1:
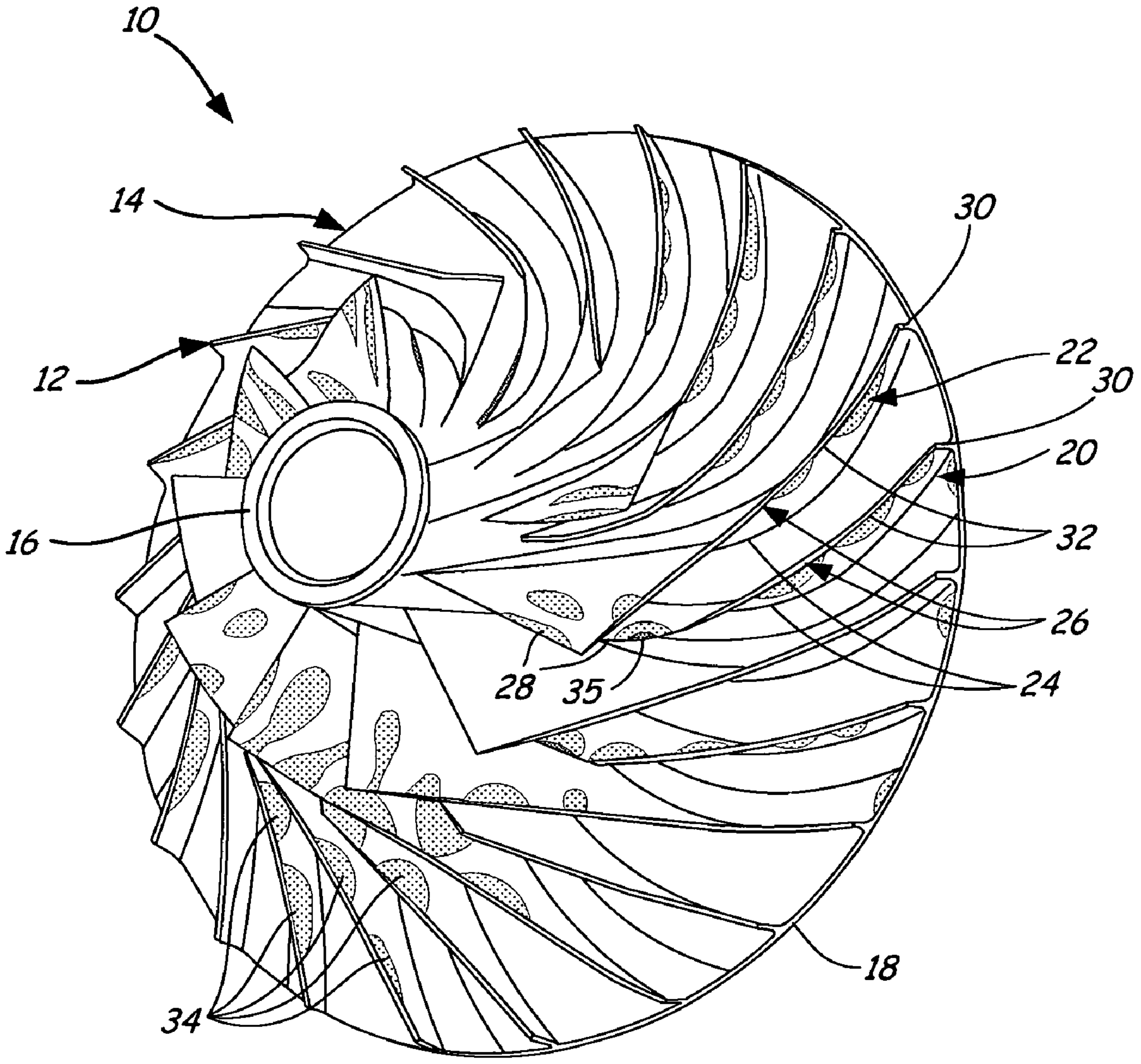
FIG. 1 is a perspective view of a radial compressor.

FIG. 1 is a perspective view of radial compressor 10 (also called an impeller or a bladed disc). Radial compressor 10 includes a plurality of blades 12 connected to disc 14 (also called a body). Disc 14 is curved and substantially frusto-conical, extending from hub 16 at its inner diameter to rim 18 at its outer diameter. Blades 12 includes a series of splitter blades (e.g. splitter blade 20) positioned alternately with a series of main blades (e.g. main blade 22). Splitter blade 20 has a different shape, including a shorter chord length, than that of main blade 22. Splitter blade 20 and main blade 22 each have fixed edge 24 attached to disc 14 and free edge 26 unattached. Free edge 26 includes leading edge 28, trailing edge 30, and side edge 32 there-between.

Hub 16 can be attached to a compressor shaft of a gas turbine engine (not shown). In operation, air from a turbine inlet (not shown) can pass over leading edge 28, is compressed by blades 12 as radial compressor 10 rotates, and passes over trailing edge 30 on its way to a combustion chamber (not shown). Because operation of gas turbine engines is well known in the art, it will not be described in detail herein. However, during engine operation, various aero-excitation source frequencies can be created as air passes over components of the gas turbine engine, such as inducer or exducer vanes. Different source frequencies can be created at different operating speeds. These source frequencies are transmitted to the air, causing unsteady fluid pressure, and can then be transmitted to radial compressor 10. Radial compressor 10 can have one or more natural frequencies (also called resonance frequencies) in which one or more blades 12 and/or disc 14 will vibrate. If a natural frequency coincides with an aero-excitation source frequency, an interference can occur, causing undesired harmonic vibration. A variety of possible blade anti-nodes 34 are illustrated on free edges 26 of blades 12. Primary anti-node 35 is that with the greatest deflection of all blade anti-nodes 34 on a particular blade 12. If a particular blade 12 has two anti-nodes 34 with almost the same deflection, both can be referred to as primary anti-nodes 35, and any other anti-nodes 34 can be referred to as secondary anti-nodes 34.

Figure 2A:
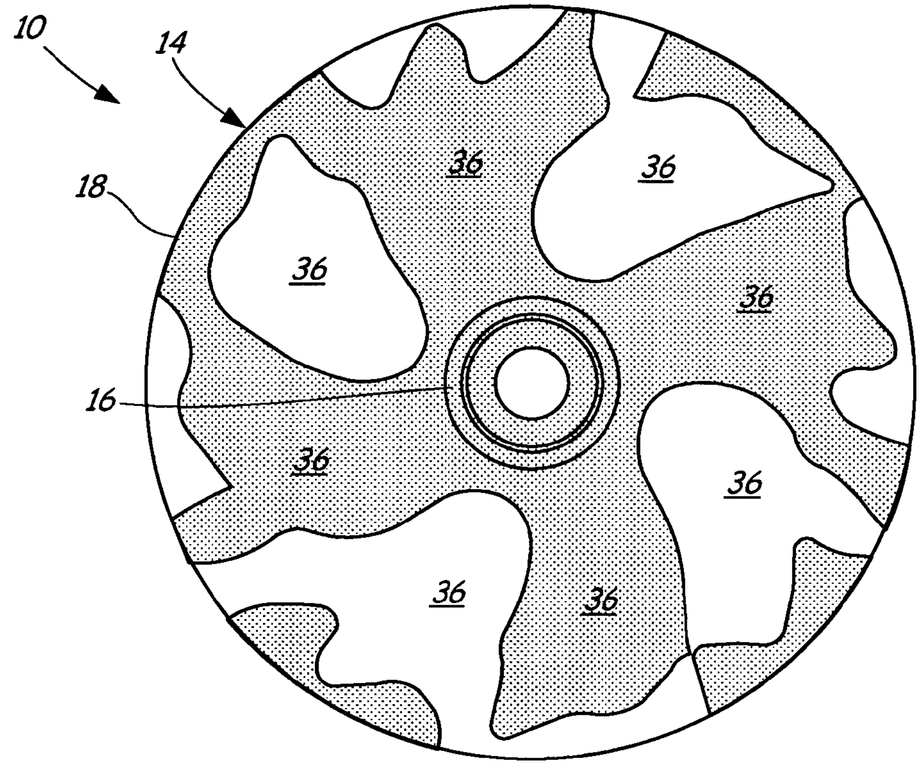
FIG. 2A is rear view of the radial compressor of FIG. 1, showing deflection of a resonant mode shape.

FIG. 2A is rear view of radial compressor 10, showing deflection of a resonant mode shape of disc 14. In the illustrated resonant mode shape, eight disc anti-nodes 36 are present. Disc anti-nodes 36 are points of greatest deflection of disc 14 in this resonant mode shape.

Figure 2B:
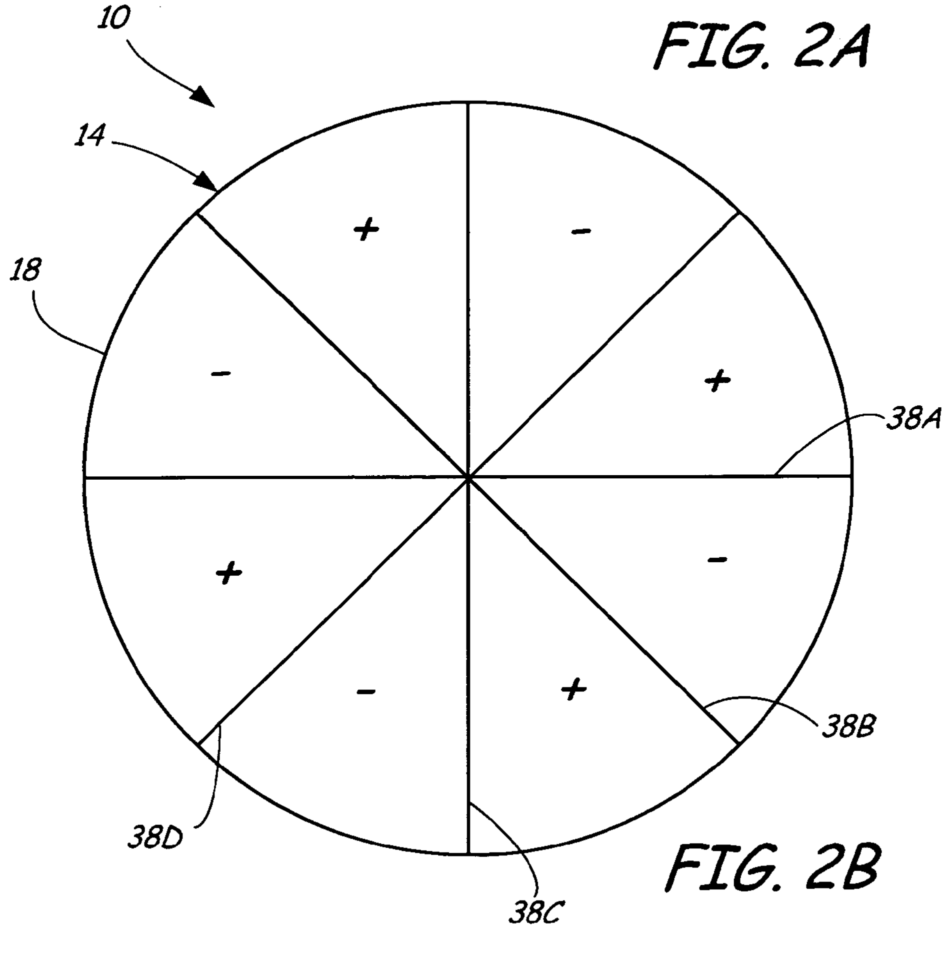
FIG. 2B is a simplified schematic view of the resonant mode shape of FIG. 2A.

FIG. 2B is a simplified schematic view of the mode shape of FIG. 2A. Nodal diameters 38A-38D divide disc anti-nodes 36. While disc anti-nodes 36 (shown in FIG. 2A) are points of greatest deflection, nodal diameters 38A-38D are lines of approximately zero deflection during harmonic vibration. The "+" and "−" symbols illustrate direction of deflection for disc anti-nodes 36 at a given moment in time. Deflection caused by harmonic vibration of disc 14 is transmitted to, and combines with deflection of, blades 12 (shown in FIG. 1).

Figure 3:
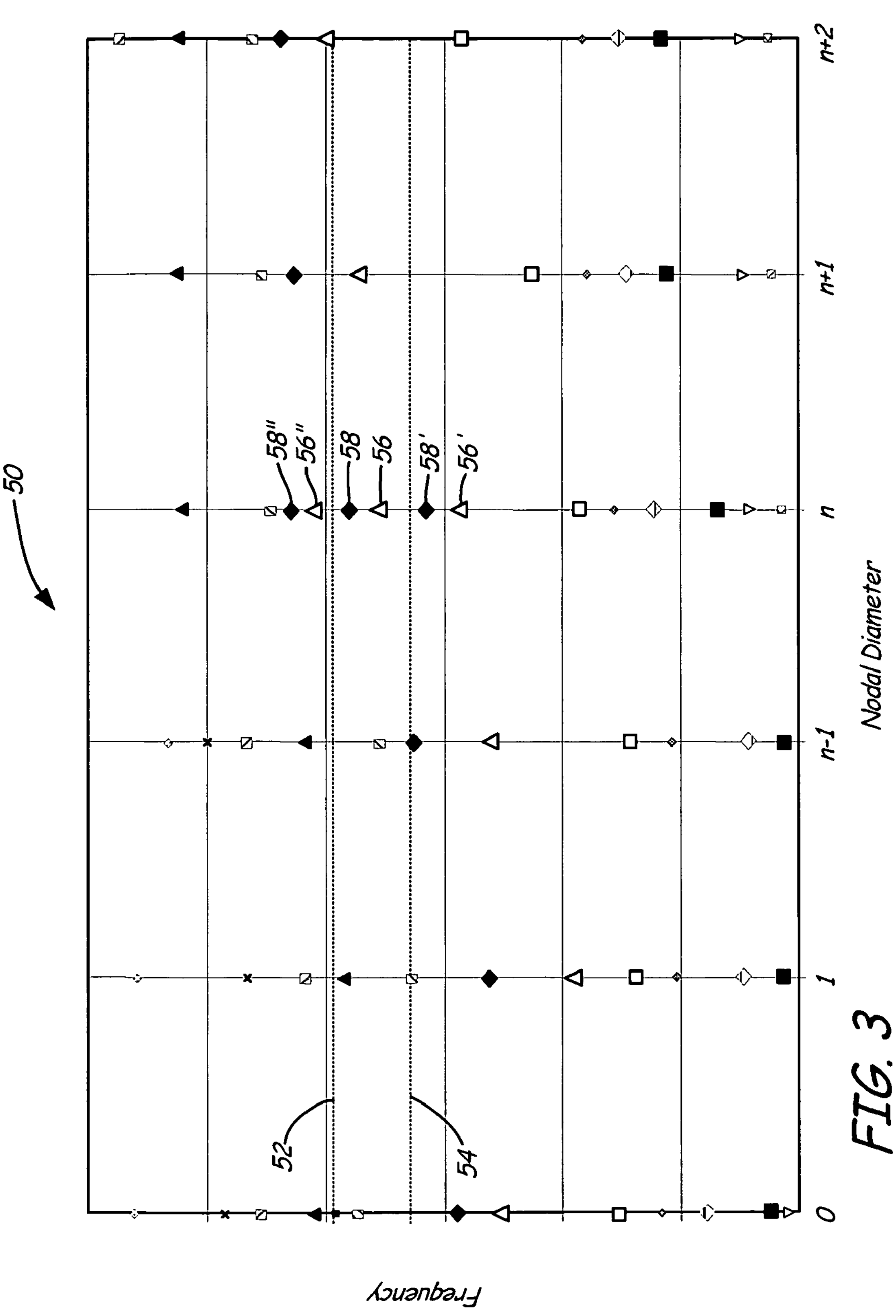
FIG. 3 is a nodal diameter interference map.

FIG. 3 illustrates nodal diameter (ND) interference map 50. ND interference map 50 plots potential interferences associated with various nodal diameters against vibration frequency. Along the horizontal axis of ND interference map 50, nodal diameters are identified as n−1, n, n+1, etc. Along the vertical axis, vibration frequency is plotted. Upper bound line 52 and lower bound line 54 are upper and lower bounds of an expected operating speed range of a gas turbine engine. Because gas turbine engines tend to operate within their expected operating speed ranges, vibration interferences that occur within the expected operating speed range can be of particular importance.

For example, radial compressor 10 has a variety of natural frequencies associated with nodal diameter n that are potentially excitable at different operating speeds. However, radial compressor 10 only has two natural frequencies 56 and 58 associated with nodal diameter n that occur in the expected operating speed range. As illustrated, natural frequency 56 corresponds to splitter blade 20 and natural frequency 58 corresponds to main blade 22. It can be desirable to tune radial compressor 10 such that natural frequencies 56 and 58 excite outside of the expected operating speed range. For example, radial compressor 10 could be tuned such that natural frequencies 56' and 58' occur below lower bound line 54. In that case, natural frequencies 56' and 58' will not be excited in the expected operating speed range. Natural frequencies 56' and 58' could, however, be excited for a period of time as the gas turbine engine speeds up during initial startup and shutdown. Alternatively, radial compressor 10 could be tuned such that natural frequencies 56" and 58" occur above upper bound line 52. In that case, natural frequencies 56" and 58" will not be excited in the expected operating speed range nor during initial startup and shutdown. In further alternative, radial compressor 10 could be tuned such that natural frequency 56' occurs below lower bound line 54 and natural frequency 58" occurs above upper bound line 52.

Figure 4:
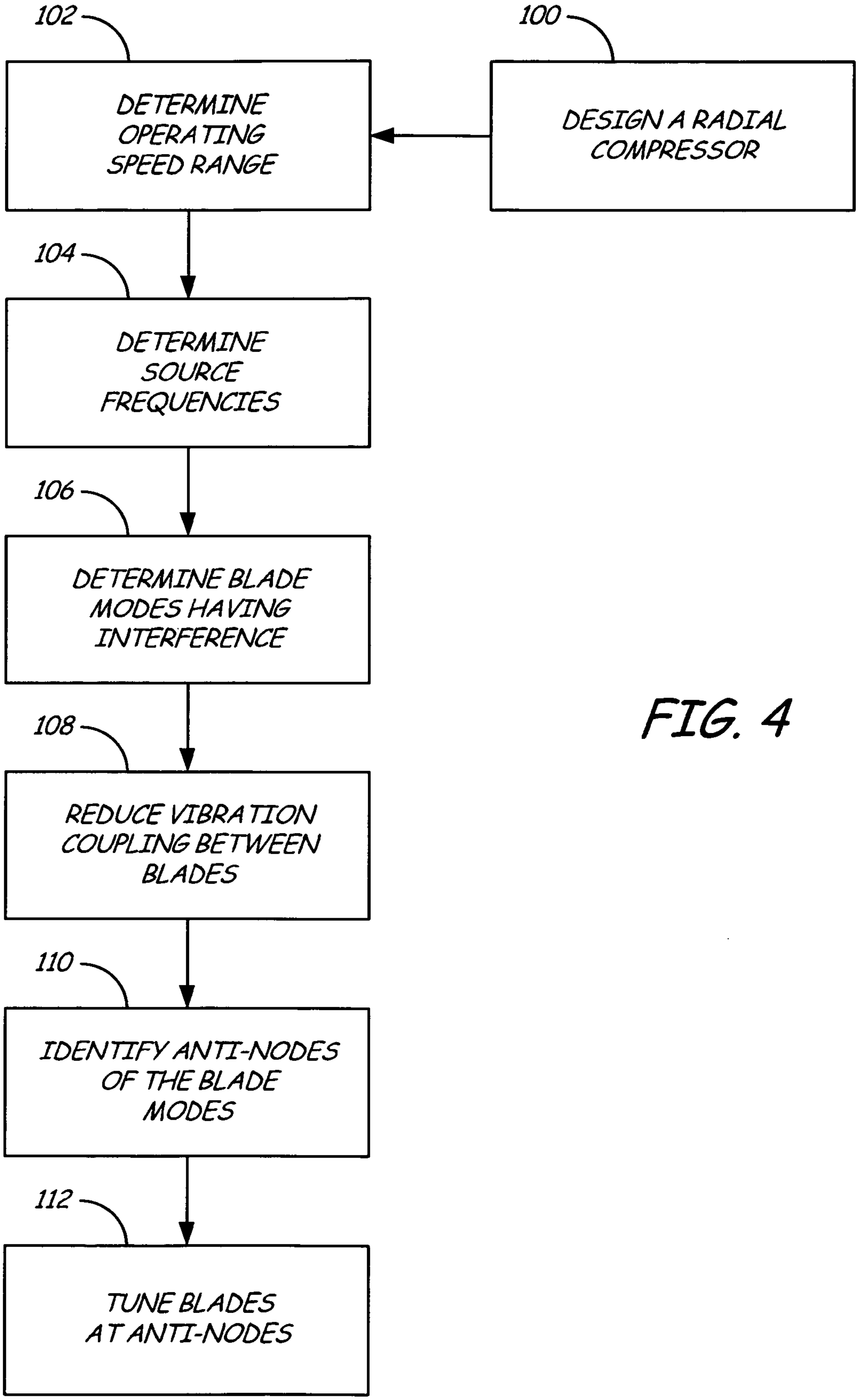
FIG. 4 is a flow chart of a method of tuning the radial compressor of FIG. 1.

FIG. 4 is a flow chart of a method of tuning radial compressor 10. The method begins by designing a radial compressor, such as radial compressor 10 of FIG. 1, that requires tuning (step 100). In step 100, radial compressor 10 can be physically fabricated, or an electronic model of radial compressor 10 can be created. Next, an expected operating speed range for radial compressor 10 is determined (step 102). For example, radial compressor 10 could be expected to operate in a particular gas turbine engine in a speed range of between about 15,300 revolutions per minute (RPM) and about 15,900 RPM. Then aero-excitation source frequencies in the expected operating speed range are determined (step 104). The aero-excitation source frequencies coincide with integer multiples of the engine operating speed (the rotational frequency of radial compressor 10). Next, blade resonant mode shapes which have interferences are determined (step 106). An interference occurs when one of blades 12 has a resonant mode with a natural frequency that coincides with one of the aero-excitation source frequencies at a particular nodal diameter n. In some circumstances (such as that illustrated above with respect to FIG. 3), splitter blade 20 and main blade 22 will each have a different blade resonant mode with a corresponding natural frequency that coincides with one of the aero-excitation source frequencies within the expected operating speed range.

Once the blade resonant modes are identified, stiffness of disc 14 is modified to reduce transmission of vibration between blades 12 (step 108). Prior art discs can be relatively thin, allowing vibration in one blade, such as splitter blade 20, to be easily transmitted to and excite another nearby blade, such as main blade 22. This effect couples blade vibrations together such that modifications to splitter blade 20 also affect natural frequency of main blade 22. This coupling can make it difficult to predictably tune a given blade. Thickness of disc 14 can be increased to stiffen disc 14 in order to reduce transmission of vibration between splitter blade 20 and main blade 22. For example, thickness of disc 14 can be increased at rim 18 to a thickness greater than about 1.3 times a thickness of trailing edge 30 of one of blades 12. If disc 14 is connected to blades 12 with a tapered fillet portion (not shown) at fixed edge 24, thickness of trailing edge 30 is measured at a normal portion of trailing edge 30, not the tapered portion. Thickness can be increased until vibrations between splitter blade 20 and main blade 22 are substantially decoupled when operating in the expected operating speed range. After decoupling, vibrations in splitter blade 20 will not excite resonant vibrations in main blade 22, and vise versa. Decoupling can be performed using a finite element method.

After splitter blade 20 and main blade 22 are decoupled, location of blade anti-nodes 34 of the blade resonant mode shapes with interferences are identified on each of splitter blade 20 and main blade 22 (step 110). Blade anti-nodes 34 typically occur along free edge 26, and in particular, along leading edge 28. If there is more than one blade anti-node 34 along free edge 26, one or more primary anti-nodes 35 have greater deflection than all other blade anti-nodes 34 of the blade resonant mode shape in question. In radial compressors such as radial compressor 10, one primary anti-node 35 is typically positioned along leading edge 28. Location of blade anti-nodes 34 can be determined through eigenvalue solutions, in a manner known in the art.

Then splitter blade 20 and main blade 22 are tuned at blade anti-nodes 34 (step 112). Tuning is performed by modifying mass localized at one or more blade anti-nodes 34 on each of splitter blade 20 and main blade 22. Increasing mass at blade anti-node 34 decreases natural frequency, and decreasing mass at blade anti-node 34 increases natural frequency. Mass can be modified until the natural frequency of the blade resonant mode shapes that have interferences are moved out of the expected speed range. Mass can be further modified to further increase a substantially resonance-free running range at the nodal diameter at issue. Because splitter blade 20 is vibrationally decoupled from main blade 22, each blade can be independently tuned without mistuning the other. Step 112 can be repeated to tune all of blades 12. It can be relatively effective and efficient to modify mass only at primary anti-node 35 on each leading edge 28 of blades 12. If further tuning is desired, mass quantity can be modified on one or more of blades 12 at an additional blade anti-node. After tuning is complete, radial compressor 10 can have no natural frequencies that excite in the expected operating speed range. Leading edges 28 are tuned to prevent natural frequencies from exciting at speeds within the expected operating speed range.

Some or all of steps 100-112 can be performed physically, electronically, or both. If steps 100-112 are performed electronically, radial compressor 10 can then be fabricated as electronically modified and tuned. Radial compressor 10 can be fabricated using techniques such as forging and machining.

Figure 5:
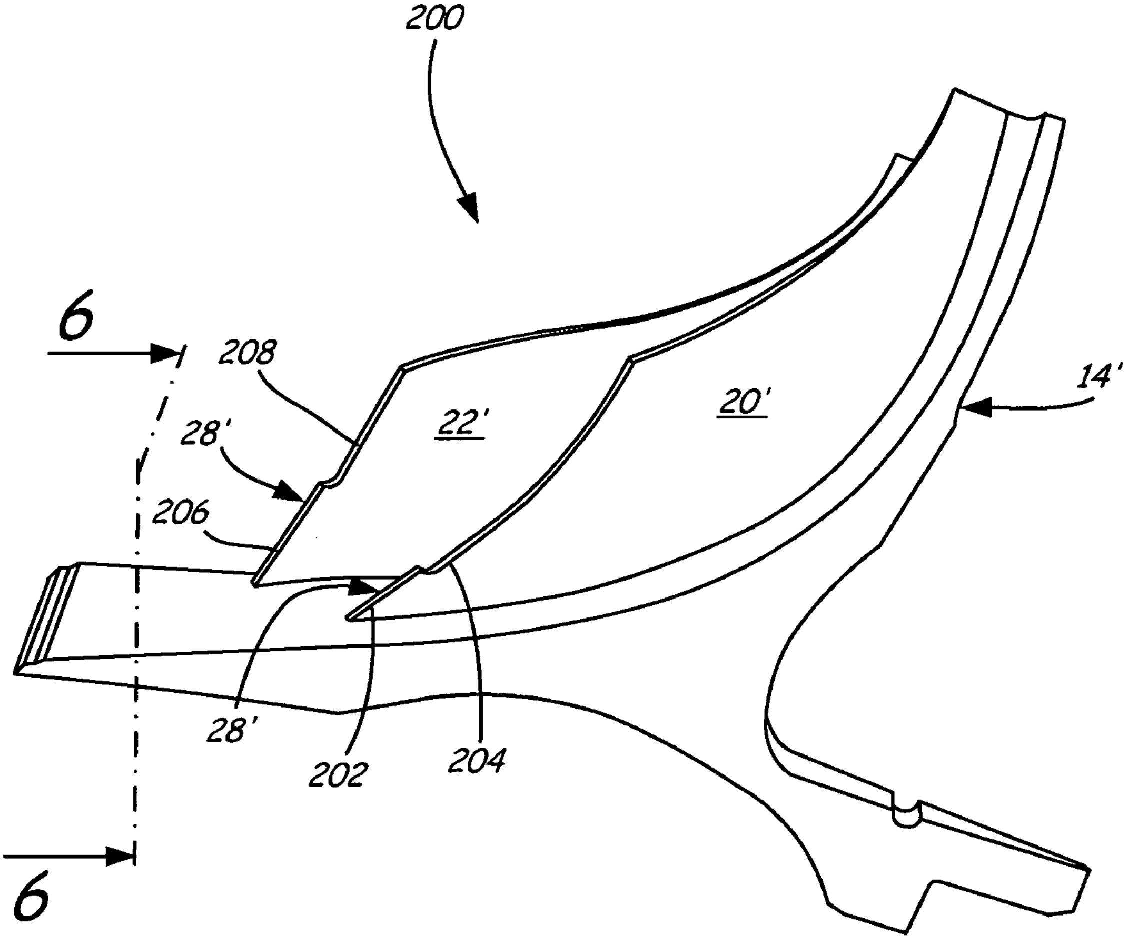
FIG. 5 is an enlarged view of a cyclic sector of the radial compressor of FIG. 1.

FIG. 5 is an enlarged sectional view of cyclic sector 200, which is one of a plurality of duplicate sectors of radial compressor 10 and has been modified as described with respect to the method of FIG. 4. Cyclic sector 200 includes splitter blade 20' and main blade 22' connected by disc 14'. Disc 14' is similar to disc 14 of FIG. 1 except that disc 14' is sufficiently thick to decouple vibration between splitter blade 20' and main blade 22'. Splitter blade 20' is similar to splitter blade 20 of FIG. 1 except that leading edge 28' of splitter blade 20' has normal portion 202 and tuned portion 204. Main blade 22' is similar to main blade 22 of FIG. 1 except that leading edge 28' of main blade 22' has normal portion 206 and tuned portion 208. Tuned portions 204 and 208 are positioned at locations that coincided with anti-nodes prior to tuning, and prevent formation of those anti-nodes at speeds within the expected operating speed range. Tuned portions 204 and 208 can be described as a notch, where mass is trimmed to increase natural frequencies of blade modes of each of splitter blade 20' and main blade 22'. In the illustrated embodiment, tuned portions 204 and 208 are positioned radially further from disc 14 than normal portions 202 and 206.

Figure 6:
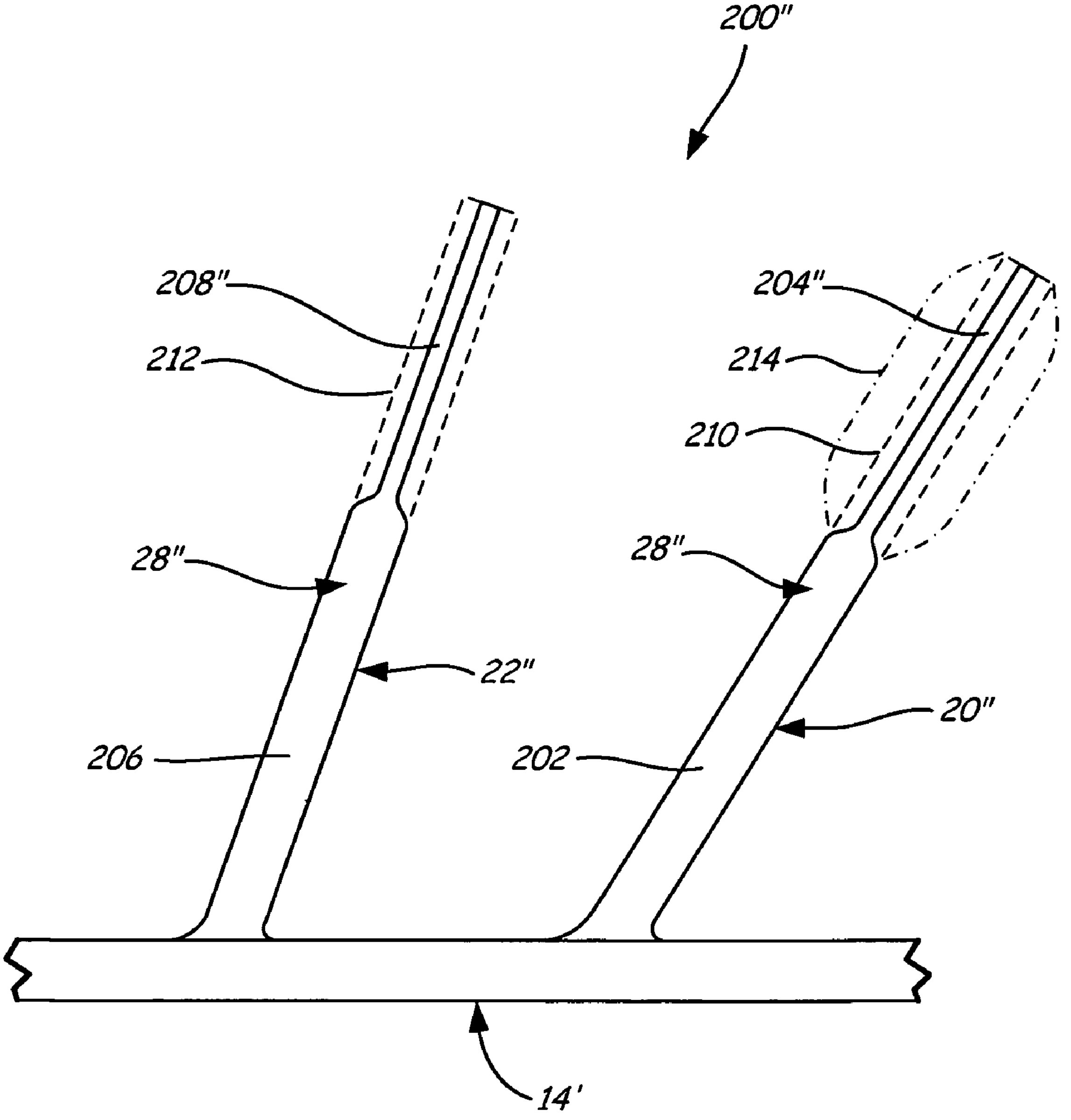
FIG. 6 is a schematic sectional view of an alternative embodiment of the cyclic sector of the radial compressor taken along line 66 of FIG. 5.

FIG. 6 is a schematic sectional view of an alternative embodiment of cyclic sector 200" of radial compressor 10 taken along line 6-6 of FIG. 5. Cyclic sector 200" of FIG. 6 is similar to cyclic sector 200 of FIG. 5 except for mass modification at tuned portions 204" and 208". In the illustrated embodiment, mass removal can be achieved by smoothly and continuously reducing thickness of each of splitter blade 20" and main blade 22" at tuned portions 204" and 208". Tuned portions 204" and 208" are thinner than normal portions 202 and 206, respectively. Non-tuned thicknesses 210 and 212 (a thickness of tuned portions 204" and 208" prior to tuning) are substantially equal to thicknesses of normal portions 202 and 206, respectively. The locations of tuned portions 204" and 208" would coincide with anti-nodes if tuned portions 204 and 208 had thicknesses substantially equal to those of normal portions 202 and 206, respectively.

Splitter blade 20" and main blade 22" can also be modified by adding mass at tuned portions 204" and 208". For example, mass addition can be achieved by smoothly and continuously increasing thickness of splitter blade 20" at tuned portion 204" from non-tuned thickness 210 to increased mass tuned thickness 214. Smooth mass modification allows for reduced aerodynamic impact and flow separation.

After splitter blade 20" and main blade 22" are tuned, each blade's contour profile geometry can be optimized to reduce stress concentration while maintaining a desirable aero-constraint on an incident angle of leading edge 28" within about 2 degrees. All of radial compressor 10 can be tuned similarly to cyclic sector 200" such that main blade 22" is one of a plurality of substantially similar tuned main blades and splitter blade 20" is one of a plurality of substantially similar tuned splitter blades.

It will be recognized that the present invention provides numerous benefits and advantages. For example, tuning radial compressor 10 moves natural frequencies out of an expected operating speed range and, therefore, reduces vibratory stresses and cracks in radial compressor 10. By increasing thickness of disc 14, splitter blade 20 and main blade 22 can be decoupled and, consequently, independently tuned. By modifying mass at primary anti-nodes 35 on splitter blade 20 and main blade 22, tuning can be more efficient and more effective than by modifying mass at other locations on blades 12, disc 14, or elsewhere in the gas turbine engine. Additionally, by modifying mass at leading edges 28 instead of at trailing edges 30, problems associated with mass modification at trailing edge 30 can be reduced (such as weakening the blades due to elastic deformation if trailing edge 30 is made thinner or increasing steady state stress if trailing edge 30 is made thicker).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, blades 12 and disc 14 need not be configured as specifically illustrated so long as they are part of a radial compressor that benefits from tuning as described.

The invention claimed is:

1. A radial compressor for use in a gas turbine engine operating in an expected operating speed range, the radial compressor comprising:

a first radial compressor blade having a first leading edge with a first normal portion and a first tuned portion, wherein the first tuned portion has a thickness different than that of the first normal portion;

a second radial compressor blade having a second leading edge with a second normal portion and a second tuned portion, wherein the second tuned portion has a thickness different than that of the second normal portion; and a substantially frusto-conical disc connecting the first radial compressor blade to the second radial compressor blade and having a thickness sufficient to decouple vibration in the first radial compressor blade from vibration in the second radial compressor blade when operating in the expected operating speed range.

2. The radial compressor of claim 1, wherein the first radial compressor blade has a trailing edge, wherein the disc has a rim at its outer diameter, and wherein the rim has a thickness greater than about 1.3 times a thickness of the trailing edge.

3. The radial compressor of claim 1, wherein thicknesses of the first and second tuned portions are sufficiently different from thicknesses of the first and second normal portions to tune natural frequencies of the first and second radial compressor blades outside of the expected operating speed range.

4. The radial compressor of claim 1, wherein the first and second tuned portions cause the first and second radial compressor blades, respectively, to have first and second natural frequencies that excite at operating speeds greater than the expected operating speed range.

5. The radial compressor of claim 1, wherein the first tuned portion causes the first radial compressor blade to have a first natural frequency that excites at a first operating speed below the expected operating speed range and wherein the second tuned portion causes the second radial compressor blade to have a second natural frequency that excites at a second operating speed greater than the expected operating speed range.

6. The radial compressor of claim 1, wherein the first radial compressor blade is one of a plurality of substantially similar splitter blades and the second radial compressor blade is one of a plurality of substantially similar main blades, wherein the splitter blades have a shorter chord length than that of the main blades, and wherein the splitter blades are positioned alternately with the main blades around the disc.

7. The radial compressor of claim 1, wherein the first and second tuned portions are positioned to prevent formation of first and second vibration anti-nodes at the first and second tuned portions at speeds within the expected operating speed range.

8. The radial compressor of claim 1, wherein the first and second tuned portions are positioned further from the disc than the first and second normal portions, respectively.

9. The radial compressor of claim 1, wherein the first tuned portion is thinner than the first normal portion.

10. The radial compressor of claim 9, wherein the second tuned portion is thinner than the second normal portion.

11. The radial compressor of claim 9, wherein the second tuned portion is thicker than the second normal portion.

12. The radial compressor of claim 1, wherein the radial compressor is an impeller having a curved disc for a gas turbine engine.

13. A gas turbine engine comprising:

a radial compressor having first and second radial compressor blades with tuned leading edges that prevent natural frequencies from exciting at speeds within an expected operating speed range.

14. The radial compressor of claim 13, wherein the radial compressor includes a substantially frusto-conical disc connecting the first radial compressor blade to the second radial compressor blade and having a thickness sufficient to decouple vibration in the first radial compressor blade from vibration in the second radial compressor blade when operating in the expected operating speed range.

15. A method for tuning a radial compressor, the method comprising:

designing the radial compressor to have a first blade connected to a second blade by a disc, wherein the first and second blades have first and second blade resonant modes that excite in an expected operating speed range of the radial compressor;

modifying the disc to have a stiffness sufficient to reduce transmission of vibration between the first and second blades when operating in the expected operating speed range;

tuning the first and second blades by modifying mass quantity at primary anti-nodes of the first and second blade resonant modes, respectively; and fabricating the radial compressor as modified and tuned.

16. The method of claim 15, wherein the first blade has a trailing edge, wherein the disc has a rim at its outer diameter, and wherein modifying the disc causes the rim to have a thickness greater than about 1.3 times a thickness of the trailing edge.

17. The method of claim 15, wherein the disc is modified by increasing thickness of the disc.

18. The method of claim 15, wherein the step of designing the radial compressor includes creating an electronic model of the radial compressor.

19. The method of claim 15, wherein the steps of modifying and tuning occur electronically.

20. The method of claim 15, wherein the primary anti-nodes are positioned at first and second leading edges of the first and second blades, respectively.

21. The method of claim 20, wherein the first blade is tuned by decreasing mass at the primary anti-node on the first blade.

22. The method of claim 20, wherein the second blade is tuned by decreasing mass at the primary anti-node on the second blade.

23. The method of claim 15, and further comprising:

identifying the primary anti-nodes of the first and second blades through eigenvalue solutions.

24. The method of claim 15, wherein the primary anti-node on the first blade has a greater deflection than all other anti-nodes of the first blade resonant mode and the primary anti-node on the second blade has a greater deflection than all other anti-nodes of the second blade resonant mode.

* * * * *

UNITED STATES PATENT AND TRADEMARK OFFICE

CERTIFICATE OF CORRECTION

PATENT NO. : 8,172,511 B2
APPLICATION NO. : 12/387536
DATED : May 8, 2012
INVENTOR(S) : Loc Q. Duong, Shiv C. Gupta and Xiaolan Hu It is certified that error appears in the above-identified patent and that said Letters Patent is hereby corrected as shown below:

Title Page, Item (73) should read:
Delete “Hamilton Sunstrand Corporation”
Insert --Hamilton Sundstrand Corporation--

Col. 2, Line 5
Delete “66”
Insert --6—6--

Signed and Sealed this
Thirty-first Day of July, 2012

David J. Kappos
*Director of the United States Patent and Trademark Office*